No. 652,644. Patented June 26, 1900.
T. H. ROSS.
SPLIT BOLT.
(Application filed Feb. 28, 1900.)
(No Model.)
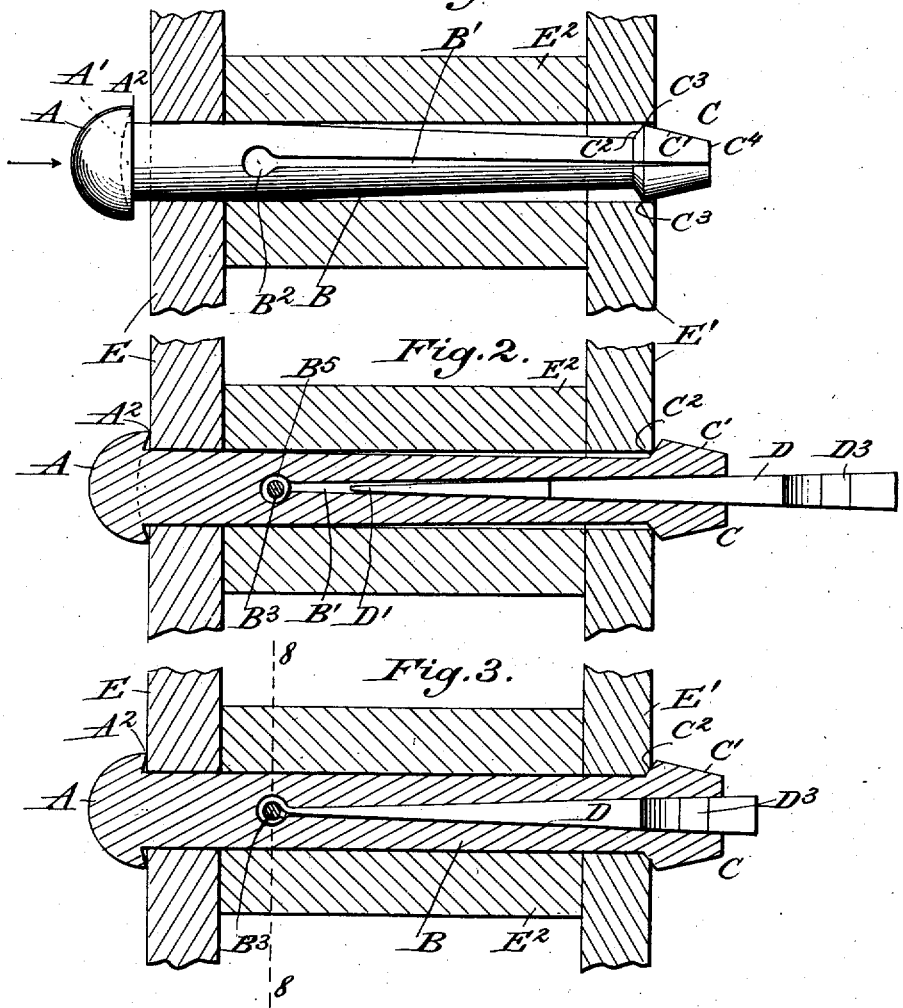
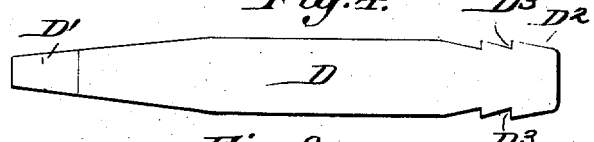
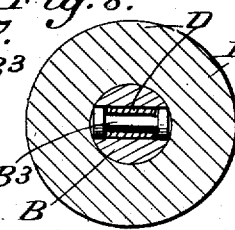

UNITED STATES PATENT OFFICE.

THOMAS H. ROSS, OF NEW YORK, N. Y., ASSIGNOR, BY DIRECT AND MESNE ASSIGNMENTS, TO THE ROSS ATTACHMENT AND MACHINE COMPANY, OF SAME PLACE.

SPLIT BOLT.

SPECIFICATION forming part of Letters Patent No. 652,644, dated June 26, 1900.

Application filed February 28, 1900. Serial No. 6,878. (No model.)

*To all whom it may concern:*

Be it known that I, THOMAS H. ROSS, a subject of the Queen of Great Britain, and a resident of the city of New York, borough of Brooklyn, State of New York, have invented certain new and useful Improvements in Split Bolts, of which the following is a full, clear, and exact description, such as will enable those skilled in the art to which it appertains to make and use the same, reference being had to the accompanying drawings, forming a part of this specification.

This invention relates to improvements in bolts of that description which are split lengthwise at one end and provided with a wedge adapted to be inserted in the bifurcation formed by the split to force the two members apart and by means of which the bolt is held in place.

The invention consists in the novel construction, combination, and arrangement of parts, such as will be hereinafter fully described, pointed out in the appended claims, and illustrated in the accompanying drawings.

In the drawings, in which similar letters of reference designate corresponding parts, Figure 1 shows a sectional view of pieces of metal in position to be joined together and a plan view of the bolt embodying the invention partly inserted in the said pieces of metal. Fig. 2 is a sectional view showing the bolt in position and the wedge partly inserted. Fig. 3 is a similar view showing the wedge in place. Fig. 4 is a plan view of the wedge. Fig. 5 is a view of the bolt, showing a cross-section of the same at the hole in which the locking-pin is placed. Fig. 6 is a plan view of the locking-pin. Fig. 7 is a view of the bolt, similar to that shown in Fig. 5, with the locking-pin in place. Fig. 8 is a sectional view on the line 8 8 of Fig. 3.

The head A of the bolt is hemispherical in shape, and its inner face A' is somewhat dished and forms an acute angle with the shank of the bolt. The curved face of the head of the bolt meeting with the inner face A' forms the circular edge A².

The shank B is bifurcated at the end opposite the head A. A longitudinal slot B' enters the shank and extends about three-fourths its length. This slot is substantially wedge shape in form and at its inner end opens into the circular recess B², passing transversely through the shank. In the recess is secured the locking-pin B³, of less diameter than that of said recess. The pin is held in place by the shoulders B⁴ projecting from its ends and welded or otherwise secured in the ends of the recess. The outer ends of the pin are shaped to fill the outer ends of the recess, so as to make an unbroken surface. It is to be observed that between the wall of the recess and the pin, inside of the shoulders of the latter, an annular chamber B⁵ is formed. The bifurcated end of the shank is provided with a supplemental head C, somewhat in the shape of the frustum of a cone. The outer face C' and the inner face C² come together and form a circular shoulder C³. The head is so shaped that when the two members of the same are forced together, as shown in Fig. 1, for instance, the diameter of the shoulder C' is the same as that of the shank immediately back of the head A. The outer end of the supplemental head is tapered, so that when its two members are spread apart the extreme end C⁴ will have a diameter less than that of the shank immediately back of the head A.

The wedge D is shaped to fit the slot B', and its dimensions are such that when it is in place the two members of the shank will be forced apart to such an extent as to give the shank the same diameter throughout its entire length. The entering end D' of the wedge is ductile to such an extent as to permit it being bent without fracture. The head D² is shaped to conform with the supplemental head C, except that it is provided with notches D³ to receive a withdrawing-tool.

Interposed between the plates E and E', which are to be held together, is the sleeve E². These three parts are arranged so that their openings register with each other. A bolt is selected to fit the opening. Such a bolt will have a shank with a diameter immediately back of the head A little less than the diameter of the openings. Normally the two members of the bifurcation are spread apart, so that the diameter of the shank is the same throughout its length. As the inner end C⁴ of the bolt has a diameter less than that of the shank, and consequently less than that of the openings, it can be readily introduced into the opening in the plate A. After the inner end of the bolt is inserted in the opening it is driven through the plates and the sleeve. In its passage into the first hole the tapering outer face C' of the supplemental head by bearing against the side of the hole forces the two members of the bifurcation together. As the diameter of the shoulder C³ when the two members are forced together is the same, or it may be less, as that of the shank immediately back of the head A, it will readily pass through the openings. After the supplemental head has passed through the hole in the second plate the two members of the bifurcation will spring apart owing to the elasticity of the metal.

It is to be noticed that the distance between the circular edge A² of the head of the bolt and the inner face C² of the supplemental head is less than the distance between the outer faces of the plates E and E', so that when the bolt is in place the inner face C² bears on the edge of the hole in the plate E', as shown in Fig. 2.

After the bolt has been placed in position the wedge D is inserted between the two members of the supplemental head. As the wedge is driven in, it gradually forces the two members of the bifurcation apart. By reason of the beveled face C² bearing on the edge of the metal the plates and the sleeve are drawn tightly together. The force with which these parts are drawn together is sufficient to slightly upset the edge of the metal against which the beveled face C² bears and also to slightly turn the edge A² of the head A of the bolt. By this means the plates and sleeve are firmly secured together. The inner edge of the wedge as the latter is driven in will enter the annular chamber B⁵ and bend around the pin B⁸. This will secure the wedge against accidental displacement. When it is desired to remove the bolt, the wedge is withdrawn by a suitable tool adapted to engage with the notches D⁵. As the inner edge of the wedge is ductile, it will unbend without fracture from around the pin as the wedge is withdrawn. By driving on the inner end of the bolt it can be easily displaced. In this way a bolt is provided which will firmly unite the parts to be connected and which at the same time can be easily removed without destroying any of its parts or injuring them so as to prevent their further use.

Having thus described my invention, what I claim, and desire to secure by Letters Patent, is—

1. In a bolt, the combination of a shank bifurcated at one end and having a recess at the inner end of the bifurcation, a pin secured in said recess, and a wedge adapted to be inserted in the bifurcation and its inner end bent around said pin.

2. In a bolt, the combination of a shank bifurcated at one end and having a recess at the inner end of the bifurcation, a pin secured in said recess, a supplemental head at the bifurcated end of the shank having a tapering outer periphery and a beveled inner face, and a wedge adapted to be inserted in the bifurcation and its inner end bent around said pin.

3. In a bolt, the combination of a shank bifurcated at one end, a head at the other end of said shank, a supplemental head at the bifurcated end of the shank having a shoulder with a diameter the same as that of the solid part of the shank when the two members of the bifurcation are pressed together and also having a periphery tapering toward its end which has a diameter the same as that of the solid part of the shank when the two members of the bifurcation are separated, and a wedge adapted to be inserted in the bifurcation of said shank.

4. In a bolt, the combination of a shank bifurcated at one end, a head at the other end of said shank having its inner face dished, a supplemental head at the bifurcated end of the shank having a beveled inner face and provided with a shoulder having a diameter the same as that of the solid part of the shank when the two members of the bifurcation are pressed together and also having a periphery tapering toward its end which has a diameter the same as that of the solid part of the shank when the members of the bifurcation are spread apart, and a wedge adapted to be inserted in the bifurcation of the shank.

5. In a bolt, the combination of a shank bifurcated at one end and having a recess at the inner end of the bifurcation, a pin secured in said recess, a head at the solid end of said shank, a supplemental head at the bifurcated end of the shank having a beveled inner face and provided with a shoulder with a diameter the same as that of the solid part of the shank when the two members of the bifurcation are forced together and also having a periphery tapering toward its end which has a diameter the same as that of the solid part of the shank when the members of the bifurcation are separated, and a wedge adapted to be inserted in the bifurcation and its inner end bent around said pin.

In testimony whereof I have signed my name to this specification in the presence of two subscribing witnesses.

THOMAS H. ROSS.

Witnesses:
R. B. LOOMIS,
T. F. FAY.